United States Patent [19]
Gorzynski

[11] Patent Number: 5,876,579
[45] Date of Patent: *Mar. 2, 1999

[54] ELECTRODIALYSIS TREATMENT

[75] Inventor: Marek Gorzynski, Düren, Germany

[73] Assignee: Eka Chemicals AB, Bohus, Sweden

[*] Notice: The term of this patent shall not extend beyond the expiration date of Pat. No. 5,643,430.

[21] Appl. No.: 831,214

[22] Filed: Apr. 2, 1997

Related U.S. Application Data

[63] Continuation of Ser. No. 383,044, Feb. 3, 1995, Pat. No. 5,643,430.

[30] Foreign Application Priority Data

Feb. 3, 1994 [SE] Sweden ................................. 9400353

[51] Int. Cl.[6] ................................................. B01D 61/44
[52] U.S. Cl. ..................... 204/523; 204/524; 204/530; 204/533; 204/536; 204/537; 204/541
[58] Field of Search .................................... 204/523, 524, 204/530, 533, 536, 537, 541

[56] References Cited

U.S. PATENT DOCUMENTS

| | | | |
|---|---|---|---|
| 4,704,463 | 11/1987 | Blytas | 549/521 |
| 4,802,965 | 2/1989 | Puetter et al. | 204/182.4 |
| 4,857,586 | 8/1989 | Bachem et al. | 524/845 |
| 4,971,672 | 11/1990 | Voss et al. | 204/537 |
| 4,975,499 | 12/1990 | Bachem et al. | 525/430 |
| 5,145,569 | 9/1992 | Schneider et al. | 204/182.4 |
| 5,198,117 | 3/1993 | Grierson et al. | 210/638 |
| 5,463,430 | 10/1995 | Gorzynski | 204/523 |
| 5,643,430 | 7/1997 | Gorzynski | 204/523 |

FOREIGN PATENT DOCUMENTS

| | | | |
|---|---|---|---|
| 0 229 415 | 7/1987 | European Pat. Off. | C07C 29/66 |
| 0 510 987 | 10/1992 | European Pat. Off. | C08G 69/48 |
| 63-4919 | 2/1988 | Japan . | |
| 63-12148 | 3/1988 | Japan . | |
| WO 92/22601 | 12/1992 | WIPO | C08G 65/30 |

OTHER PUBLICATIONS

Ullman's Encyclopedia of Industrial Chemistry, vol. A23, p. 90. *Refractory Ceramics to Silicon Carbide* (no date).
Abstract, EP 534513, dated Mar. 31, 1993.
Abstract, EP 512423, dated Nov. 11, 1992.
Ullman's Encyclopedia of Industrial Chemistry, vol. A14, pp. 394–457 (no date).

*Primary Examiner*—Arun S. Phasge
*Attorney, Agent, or Firm*—Ralph J. Mancini

[57] ABSTRACT

A process for reducing the content of organic and inorganic halogen in an aqueous solution of a nitrogen-containing epihalohydrin-based resin, in which process the aqueous resin solution is subjected to an electrodialysis treatment. The aqueous resin solutions obtained by the process are used as additives in the production of paper, board and paper board, in particular as wet-strength agents.

21 Claims, 2 Drawing Sheets

ELECTRODIALYSIS TREATMENT

This is a continuation of application Ser. No. 08/383,044 filed Feb. 3, 1995 now U.S. Pat. No. 5,643,430.

FIELD OF THE INVENTION

The present invention relates to a process for reducing the content of organic and inorganic halogen in an aqueous solution of a nitrogen-containing epihalohydrin-based resin and to the use of the product obtained by the process.

BACKGROUND OF THE INVENTION

During recent years attempts to reduce the use of halogen-containing compounds have gained an increased interest, particularly in the field of pulp and paper making. Organic halogen in organic compounds are responsible for an increased halogen load in waste water as well as in paper and paper board. Epihalohydrin-based resins are halogen-containing organic compounds widely used as additives in the production of paper, for instance as wet-strength agents. Many methods have been developed for reducing the organic halogen content of epihalohydrin-based resins. European patent application 0512423 and U.S. Pat. Nos. 4,857,586 and 4,975,499 relate to the treatment of aqueous solutions of epihalohydrin-based resins with strong bases. European patent application 0510987 discloses enzymatic dehalogenation of halogen-containing compounds present in aqueous solutions of epihalohydrin-based resins. However, a major drawback with these methods is that they only reduce the organic halogen content but increase the inorganic halogen content in the form of halogen ions, whereby the total halogen content in the aqueous solution will remain constant. This is a serious limitation since organic halogen will be formed by reactions of the halogen ions with organic compounds present in the aqueous solution, in particularly if the pH of the product is lowered to below 7, especially 3–5, for improvement of storage stability.

WO 92/22601 reveals the possibility to remove both organic and inorganic halogen from epihalohydrin-based resins by passing an aqueous solution thereof through a strongly basic ion-exchange resin. A drawback with this process is the non-continuous operation which is due to the need to regenerate the ion exchange resin from time to time. Rinsing and regeneration or backwash of the resin also produces effluents, which still contain organic compounds causing problems in the waste water due to their chemical oxygen demand, and rather high salt load since chemicals for regeneration have to be used in excess.

The use of electrodialysis has been described in the litterature on numerous occasions, see e.g. R. W. Baker et al, Membrane Separation Systems, Noyes Data Corp., 1991. Electrodialysis is a well established technique for desalination of brackish water for the production of potable water and table salt and it is most frequently used in processes involving inorganic material. However, according to U.S. Pat. Nos. 4,802,965 and 5,145,569, electrodialysis can also be used for removing salts from aqueous solutions of organic compounds.

Accordingly, it is an object of the present invention to provide a process for treating an aqueous solution of a nitrogen-containing epihalohydrin-based resin in order to produce an aqueous solution of a nitrogen-containing epihalohydrin-based resin having a reduced content of organic and inorganic halogen. It is further an object of the invention to provide a process as described above which can be carried out continuously. Another object of the present invention is to provide a process as described above which produces an aqueous solution having a reduced content of halogenated products and halogenated by-products. Still another object of the invention is to provide a process as described above which reduces the content of organic and inorganic halogen in the aqueous solution of a halogen-containing organic compound to levels lower than those obtainable by applying known methods.

The objects of the invention are achieved by a process as further defined in the claims. More specifically, the invention relates to a process for reducing the content of organic and inorganic halogen in an aqueous solution of a nitrogen-containing epihalohydrin-based resin by subjecting the aqueous solution to an electrodialysis treatment.

SUMMARY OF THE INVENTION

The present invention generally relates to a process for reducing the halogen content of aqueous solutions of epihalohydrin-based resins, and to the use of the products obtained by such process. More specifically, the present invention relates to subjecting an aqueous solution of a nitrogen-containing epihalohydrin-based resin to an electrodialysis treatment to produce an aqueous solution of a nitrogen-containing epihalohydrin-based resin having a reduced content of organic and inorganic halogen. The aqueous solutions obtained by the process are used as additives in the production of paper.

DETAILED DESCRIPTION OF THE INVENTION

According to the present invention it has been found that it is possible to subject aqueous solutions of nitrogen-contain-ing epihalohydrin-based resins to electrodialysis without clogging of the membranes. Moreover, it has been unexpectedly discovered that the electrodialytical treatment of aqueous solutions comprising nitrogen-containing epihalohydrin-based resins not only removed ionically bound halogen ions but also substantially reduced the content of organic halogen covalently bound to organic compounds present in the solution. It is believed that epoxide groups are formed in the epihalohydrin-based resins when the organic bound halogen is removed and that the organic bound halogen is converted to inorganic halogen.

By electrodialysis is meant any electrochemical process including at least one ion selective membrane. By organic halogen is meant all halogen linked to organic molecules. These halogens are preferably linked by covalent bonds to the organic compound. By inorganic halogen is meant halogen in the form of halogen ions, preferably halide ions such as $Cl^-$ and $Br^-$. The total halogen content is the sum of organic halogen and inorganic halogen.

According to the process of the present invention use can be made of any type of nitrogen-containing epihalohydrin-based resins. Suitably, the resins are formed by reactions of nitrogen-containing precursors selected from amines, polyamines, polyaminoamides and mixtures thereof with epihalo-hydrins, such as those resins described by Dan Eklund and Tom Lindström in "Paper Chemistry, An Introduction", page 97, DT Paper Science Publications, 1991. Preferably, the resins are polyaminoamide-epihalohydrin-based resins, which are also referred to as polyamidoamine-epihalohydrin-based resins. Epihalohydrins that can be used include epibromohydrin and epichlorohydrin, preferably epichlorohydrin. Suitably, the resins are produced using 0.5–2.0 moles of epihalohydrin per mole of basic nitrogen in the nitrogen-containing precursor.

The nitrogen-containing precursor is preferably the polyaminoamide reaction product of a polycarboxylic acid, suitably a dicarboxylic acid, and a polyamine. By the term "carboxylic acid" is meant to include carboxylic derivatives such as anhydrides, esters and half esters. Suitable polycarboxylic acids include saturated or unsaturated aliphatic or aromatic dicarboxylic acids. Preferably, the polycarboxylic acids contain less than 10 carbon atoms.

Suitable polycarboxylic acids include oxalic acid, malonic acid, succinic acid, glutaric acid, adipic acid, azelaic acid, sebacic acid and derivatives thereof. Mixture of these compounds can also be applied. Adipic acid is preferred.

Suitable polyamines include polyalkylene polyamines, or mixtures thereof, having the following formula:

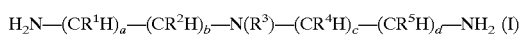

in which $R^1$–$R^5$ represent hydrogen or lower alkyl, preferably up to $C_3$ and a–d represent integers of from 0 to 4. Preferred polyalkylene polyamines include diethylene triamine, tri-ethylene tetra amine, tetraethylene penta amine, dipropylene triamine, and mixtures thereof.

The polyamines of formula (I) can be combined with other polyamines or mixtures of other amines. Preferably, these amines have the following formulae II–VII:

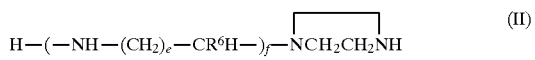
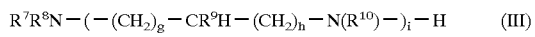
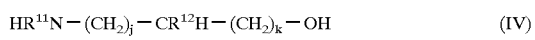

in which $R^6$–$R^{14}$ represent hydrogen or lower alkyl, preferably up to $C_3$, e–l represent integers of from 0 to 4, and m represents an integer of from 0 to 5.

The polycarboxylic acid and the polyamine can be applied in a mole ratio of from 1:0.5 to 1:1.5.

The nitrogen-containing epihalohydrin-based resin according to the invention is present in an aqueous solution which may comprise a water-miscible solvent, such as methanol, ethanol or dimethyl formamide. The aqueous resin solution is preferably prepared from an aqueous solution of a nitrogen-containing precursor. The reaction of epihalohydrin with a nitrogen-containing precursor can be performed in many different ways known to the person skilled in the art, such as those mentioned in WO 92/22601, which is hereby incorporated by reference. The molecular weights of the resins are not critical. Preferably, the molecular weights of the resins are within the range of from 50 000 to 1 000 000 or even higher.

The production of epihalohydrin-based resins leads to formation of halogenated by-products. Aqueous resin solutions produced by reaction of amines, polyamines or polyaminoamides with epihalohydrin contain undesired by-products such as 1,3-dihalo-2-propanol (DXP) and 3-halo-1,2-propanol (XPD). Especially, 1,3-dichloro-2-3-propanol (DCP) and 3-chloro-1,2-propandiol (CPD) are formed when epichlorohydrin is used. It is encompassed by the process of the invention to reduce the content of organic halogen in such low molecular weight organic compounds as well as oligomeric halogen-containing organic compounds present in the resin solutions. By the electrodialysis treatment according to the present invention, DXP and XPD as well as any remaining epihalohydrin can be converted to the halogen-free compounds glycidol and ultimately glycerol.

The solids content of the aqueous solution to be subjected to the electrodialysis treatment can be as high as 30% by weight or more, preferably 5–25% by weight, most preferably about 15–20% by weight. The viscosity of the aqueous solutions is preferably within the range of 1–100 mPas, most preferably 5–60 mPas. After the electrodialysis treatment the viscosity of the aqueous solution can be raised by further polymerisation of the resin in known manner before the use thereof, for instance as a wet-strength agent.

Electrodialysis processes and devices are well-known to the skilled person and electrolysis devices can be made from conventional parts as described, for example, by R. W. Baker et al in "Membrane Separation Systems", Noyes Data Corp., 1991.

In the process of the present invention, the electrodialysis treatment can be conducted in an electrodialysis device containing at least one electrodialysis unit cell arranged between an anode and a cathode, wherein the unit cell comprises a compartment which on the side facing towards the anode is delimited by an anion selective membrane, whereby the aqueous solution of a nitrogen-containing epihalohydrin-based resin is fed to said compartment and halogen ions are brought to migrate through said anion selective membrane by establishing an electrical potential difference between the anode and cathode. The compartment to which the aqueous resin solution is fed can on the side facing towards the cathode be delimited by any membrane preventing transport of the nitrogen-containing epihalohydrin-based resin through said membrane, preferably an anion selective membrane, cation selective membrane or bipolar membrane.

Suitably, non-halogen containing anions are introduced into the compartment to which the aqueous solution of a nitrogen-containing epihalohydrin-based resin is fed, either through the membrane facing towards the cathode or included in the aqueous resin solution. Suitable non-halogen containing anions include hydroxide, sulphate, phosphate, acetate, formiate and mixtures thereof, preferably hydroxide. In the process, use is suitably made of an aqueous solution of a salt of the non-halogen containing anion, the counter-ion of which is not critical as long as the electrodialysis treatment and equipment are not adversely affected. The salt of the non-halogen containing anion should have a solubility in the aqueous solution used sufficient to perform the electrodialysis treatment and use is suitably made of metal salts thereof, preferably alkali metals. Examples of suitable metal salts of non-halogen containing anions include LiOH, NaOH, KOH, $Na_3PO_4$, Na-acetate and Na-formiate. NaOH and KOH are preferably used. The aqueous solution used can have a concentration of the salt of non-halogen containing anion of from 0.001M or less up to saturation of the solution used, preferably 0.05–10M, most preferably 0.1–5M.

In a preferred embodiment of the present invention, the electrodialysis unit cell comprises first and second compartments and first and second anion selective membranes. The first anion selective membrane is facing towards the cathode, the second anion selective membrane is facing towards the anode, the first compartment is facing towards the cathode and is delimited by the first anion selective membrane, and the second compartment is delimited by the first and second anion selective membranes. In the process, the aqueous solution of a nitrogen-containing epihalohydrin-based resin is fed to the second compartment, non-halogen containing anions are fed to the first compartment and brought to migrate through the first anion selective membrane, and halogen ions are brought to migrate through the second anion selective membrane. Adjacent to the unit cell and facing towards the anode there can be an anode compartment.

According to further preferred embodiments of the invention, the electrodialysis unit cell comprising first and second compartments and first and second anion selective membranes further comprises a third compartment and a cation selective or bipolar membrane facing towards the anode. In the process, the halogen ions are brought to migrate into the third compartment delimited by the second anion selective membrane and the cation selective or bipolar membrane. The feed to the third compartment is suitably an aqueous solution of a salt or metal halide when the membrane of the third compartment facing towards the anode is a cation selective membrane, and suitably water or aqueous hydrochloric acid when the membrane of the third compartment facing towards the anode is a bipolar membrane. Adjacent to the unit cell and facing towards the anode there can be an anode compartment.

In another preferred embodiment of the invention, the electrodialysis unit cell comprises first and second compartments, an anion selective membrane and a bipolar membrane, wherein the bipolar membrane is facing towards the cathode, the anion selective membrane is facing towards the anode, the first compartment is facing towards the cathode and is delimited by the bipolar membrane, and the second compartment is delimited by the bipolar membrane and anion selective membrane. In the process, the aqueous solution of a nitrogen-containing epihalohydrin-based resin is fed to the second compartment, an aqueous solution of an acid or salt is fed to the first compartment and halogen ions are brought to migrate through the anion selective membrane. Alternatively, water can be fed to the first compartment. Adjacent to the unit cell and facing towards the anode there can be an anode compartment.

In another preferred embodiment of the invention, the electrodialysis unit cell comprising first and second compartments, an anion selective membrane and a bipolar membrane-facing towards the cathode further comprises a third compartment and a cation selective membrane facing towards the anode. In this process, the halogen ions are brought to migrate into the third compartment delimited by the anion selective membrane and the cation selective membrane. The feed to the third compartment can be an aqueous solution of a salt, metal halide or acid. Adjacent to the unit cell and facing towards the anode there can be an anode compartment.

Aqueous solutions of salts, metal halides and acids that can be used in the process of the invention are not critical as long as the electrodialysis treatment and equipment are not adversely affected by the solutions. Suitable salts include salts having good conductivity, such as salts of strong bases and strong acids, e.g. NaCl, KCl, LiCl, $Na_2SO_4$, $K_2SO_4$, $Li_2SO_4$, $NaNO_3$, $NH_4Cl$ and $R_4NCl$. Preferably, the salt is electrochemically inert. The salt concentration in the aqueous solutions used can be from 0.001M up to saturation of the solution, preferably 0.1–5M. As examples of suitable metal halides can be mentioned alkali metal halides, e.g. LiCl, LiBr, NaCl, NaBr, KCl, and KBr. NaCl and KCl are preferably used. The metal halide concentration in the aqueous solutions used can be of from 0.001M up to saturation of the solution, preferably 0.1–5.0M. Suitable acids include organic and inorganic acids and mixtures thereof, preferably inorganic acids. As examples of suitable inorganic acids can be mentioned hydrochloric acid, sulphuric acid, nitric acid and phosphoric acid, and use is preferably made of hydrochloric and sulphuric acid. The acid concentration in the aqueous solutions used can be from 0.001M up to 10M or even higher, preferably 0.1–5M.

In accordance with another preferred embodiment of the invention, the aqueous solution of a nitrogen-containing epihalohydrin-based resin is pre-treated with hydroxide ions before the electrodialysis treatment, whereby a part of the organic halogen in the resin is replaced by hydroxide and the following electrodialysis treatment can be carried out in commercially available equipment for desalination of water. It was surprisingly found that this pre-treatment did not cause undue polymerisation of the resin in solution or onto the membranes. The pre-treatment can be carried out by adding a hydroxide-containing salt or an aqueous solution thereof to the resin solution. Use is suitably made of metal hydroxides or mixtures of metal hydroxides, preferably an alkali metal hydroxide. Examples of suitable metal hydroxides include LiOH, NaOH and KOH. NaOH and KOH are preferably used. The pH of the aqueous resin solution after the pre-treatment is suitably above 5, preferably 8–13.

According to another preferred embodiment of the present invention involving hydroxide pre-treatment of the resin solution, the electrodialysis unit cell can comprise first and second compartments, an anion selective membrane and a first cation selective membrane. The anion selective membrane is facing towards the anode, the first cation selective membrane is facing towards the cathode, the first compartment is facing towards the cathode and is delimited by the first cation selective membrane, and the second compartment is delimited by the first cation selective membrane and anion selective membrane. In the process, the aqueous solution of a nitrogen-containing epihalohydrin-based resin and hydroxide ions, e.g. in the form of a hydroxide-containing salt, are fed to the second compartment and halogen ions are brought to migrate through the anion selective membrane. The counter-ions to the hydroxide ions are brought to migrate through the first cation selective membrane into the first compartment. Adjacent to the unit cell and facing towards the anode there can be an anode compartment through which an aqueous solution of a metal halide or acid can be passed. Water or preferably an aqueous solution of a metal hydroxide or metal halide is fed to the first compartment.

In accordance with another preferred embodiment of the present invention involving pre-treatment of the resin solution, the electrodialysis unit cell comprising first and second compartments, an anion selective membrane and first cation selective membrane further comprises a third compartment and a second cation selective membrane facing towards the anode, whereby the halogen ions are brought to migrate into the third compartment delimited by the anion selective membrane and second cation selective membrane. An aqueous solution of a salt or metal halide as previously described can be fed to the third compartment and an aqueous metal hydroxide solution can be fed to the first compartment. Adjacent to the unit cell and facing towards the anode there can be an anode compartment, through which an aqueous metal hydroxide solution can be passed.

The anion selective membranes, also referred to as anion-exchange membranes, used according to the present invention permit exchange of anions between compartments delimited by such an anion selective membrane. Examples of suitable anion selective membranes are those sold under the tradename Neosepta (manufactured by Tokuyama Soda). The cation selective membranes, also referred to as cation-exchange membranes, permit exchange of cations between compartments delimited by such an cation selective membrane. Examples of suitable cation selective membranes to be used in the process of the invention are those sold under the tradename Nafion (manufactured by DoPont). The bipolar membranes permit electrically forced dissociation of water and suitable bipolar membranes include those sold and manufactured by WSI. The compartments in the electrodialysis devices defined by the gaps between membranes and the gaps between membranes and electrodes are equipped with inlets and outlets for the flow-through of solutions.

Preferably, the current densities in the process of the present invention are within the range of 0.01–5 kA/m$^2$, most preferably within the range of 0.1–1 kA/m$^2$.

The temperature of the aqueous solutions fed to the compartments should be adapted to the membranes and to the resin solution used. Chemical reactions, e.g. polymerisation, may take place if the temperature is too high and, therefore, the temperature is preferably low so as to avoid undue polymerisation of the epihalohydrin-based resin. Suitably, the solutions are cooled in order to balance the temperature increase due to the electrodialysis treatment. The temperature may be within the range of from the freezing point of the aqueous solutions to about 40° C., preferably below 20° C. and most preferably between 5° and 20° C.

According to a preferred embodiment of the invention, the aqueous solution of a nitrogen-containing epihalohydrin-based resin is also contacted with an anion-exchange resin, which can be carried out before, simultaneously with or after the electrodialysis treatment, preferably simultaneously with or after the electrodialysis treatment. Suitably, when the simultaneous mode of operation is applied, the compartment to which the aqueous resin solution is fed contains the anion-exchange resin. Anion-exchange resins are known to the skilled person and reference is made to Ullmann's Encyclopedia of Industrial Chemistry, Vol. A14, page 393 ff, 1989. Suitably, a basic anion-exchange resin is used which generally carry cationic groups such as R—NH$_3^+$, R$_2$NH$_2^+$, R$_3$NH$^+$, R$_4$N$^+$ and R$_3$S$^+$, in which at least one R in each of the mentioned groups represent the polymer matrix. Examples of polymer matrices that can be used include those based on polystyrene, polyacrylic, phenol-formaldehyde, and polyalkylamine resins. Anion-exchange resins that can be used in the process of the present invention are described by Ullmann in the above edition and in WO 92/22601, which is incorporated herein by reference.

Preferably, the basic anion-exchange resin used in the process of the present invention contains tertiary amino groups or quaternary ammonium groups or mixtures thereof. Strongly basic anion-exchange resins are preferred over weakly basic anion-exchange resins. Examples of strongly basic anion-exchange resins include resins carrying quaternary ammonium groups having three lower alkyl substituents or quaternary ammonium groups containing at least one lower alcohol substituent. Mixed resins can also be used. The most preferred anion-exchange resins are strongly basic anion-exchange resins of the type carrying quaternary ammonium substituents selected from the group consisting of trimethyl ammonium, dimethyl-ethanol ammonium, and mixtures thereof.

The aqueous solution of a nitrogen-containing epihalohydrin-based resin can have a low pH before it is subjected to the electrodialysis treatment, e.g. a pH of about 4 or even lower. During the treatment the pH is often raised to high values, e.g. to a pH of about 12 or even higher. Suitably, the pH of the aqueous resin solution is adjusted with acid after the treatment to provide a product having a pH of lower than 5. Preferably, the pH is adjusted to a value of about 3–5 to obtain an aqueous resin solution having better stability upon storage. The pH can be adjusted by employing any feasible organic or inorganic acid or any mixture thereof. Preferred organic acids include formic, acetic and citric acid, whereas preferred inorganic acids include sulphuric acid and phosphoric acid.

In another preferred embodiment of the invention, the polarities of the electrodes are switched over at least once during the process, suitably at regular intervals. This may be applied in order to minimize any fouling on the membranes delimiting the compartment to which the aqueous resin solution is fed and preferably when use is made of unit cells not containing bipolar membranes. Suitably, the feeds to the compartments adjacent to the compartment to which the aqueous resin solution is fed are also switched over at least once, preferably at the same intervals as the electrode polarities, so as to avoid introduction of halogen ions into the aqueous resin solution. If need be, further feeds may be switched over, as will be easily appreciated by the skilled person.

According to another preferred embodiment of the invention, the electrodialysis device contains at least two electrodialysis unit cells. Suitably, the device comprises a row of adjacent unit cells arranged in the form of a stack between the anode and cathode. A multi unit cell device can contain unit cells of the same type or unit cells of different types. It will be appreciated by the person skilled in the art which unit-cells that are preferably stacked. In a multi unit cell device, the discharge stream from one cell compartment can be the feed stream of another cell compartment.

In the present process, the anode can be made of any electrically conducting material stable under anodic polarisation in the anolyte solution. Use can be made of dimension-ally stable anodes, which can be made of titanium, zirconium, hafnium, niobium or mixtures thereof, having an active surface layer of ruthenium, iridium, platinum, palladium or mixtures thereof. Examples of suitable commercial anodes are those sold by Permascand under the name DSA. Suitable anodes can also be made of graphite.

Typically, the anode reaction is oxygen evolution according to the following reaction:

$H_2O \rightarrow \frac{1}{2}O_2 + 2H^+ + 2e^-$

If halogen ions are present in the anolyte, halogen formation will take place at the anode. Thus, if chloride ions are present in the anolyte, chlorine formation takes place according to the following reaction:

$2Cl^- \rightarrow Cl_2 + 2e^-$

The anode can also be a hydrogen depolarised anode where hydrogen gas is oxidised in a gas diffusion electrode according to the following reaction:

$H_2 \rightarrow 2H^+ + 2e^-$

The cathode is suitably made of an electrically conducting material stable under cathodic polarisation in the catholyte. As examples of cathode materials can be mentioned steel, stainless steel, nickel and graphite. The cathode can also be coated with various catalysts, e.g. ruthenium oxides. Typically, the cathode reaction is hydrogen evolution according to the following reaction:

$2e^- + 2H_2O \rightarrow H_2 + 2OH^-$

The cathode can also be an oxygen depolarised cathode where oxygen is reduced in a gas diffusion electrode according to the following reaction:

$\frac{1}{2}O_2 + H_2O + 2e^- \rightarrow 2OH^-$

The electrodialytical treatment of the invention can be performed as a batch, semi-continuous or continuous process. Preferably, a semi-continuous or continuous process is used, most preferably a continuous process. The continuous process comprises continuously feeding the aqueous solution of a nitrogen-containing epihalohydrin-based resin into a cell compartment, continuously subjecting the resin solution to the electrodialysis treatment followed by continuously withdrawing the solution from the compartment. The resin solution can be recirculated and it is suitably recirculated until the desired content of organic and inorganic halogen is obtained.

Flow rates that are feasible according to the invention are dependent on the process conditions and are easily determined by the person skilled in the art taking into consideration factors such as the electrodialysis device used, size of the compartments, production capacity and current densities.

The present invention also relates to the use of the aqueous solution of a nitrogen-containing epihalohydrin-based resin having a reduced content of organic and inorganic halo-gen obtained by the process as an additive in the production of paper, board and paper board. The aqueous resin solution is preferably used as a wet-strength agent but it can also be used as a retention aid, anionic trash catcher and sizing promotor.

The invention will now be described in more detail with reference to the accompanying drawings 1–5. However, the invention is not restricted to the embodiments illustrated, but many other variants are feasible within the scope of the claims. The solutions mentioned below are aqueous solutions.

BRIEF DESCRIPTION OF THE DRAWINGS

FIG. 1 schematically illustrates an electrodialysis device (1) containing one electrodialysis unit cell (2) arranged between an anode (A) and a cathode (C). The unit cell comprises first and second compartments (3,4) and first and second anion selective membranes (5,6). A further compartment adjacent to the unit cell is facing towards the anode, here-after named the anode compartment (7). An aqueous solution comprising a nitrogen-containing epihalohydrin-based resin (4), is passed through the second compartment (4), a sodium hydroxide solution is passed through the first compartment (3) and a solution of sodium chloride or sulphate is passed through the anode compartment (7).

Figure 1:
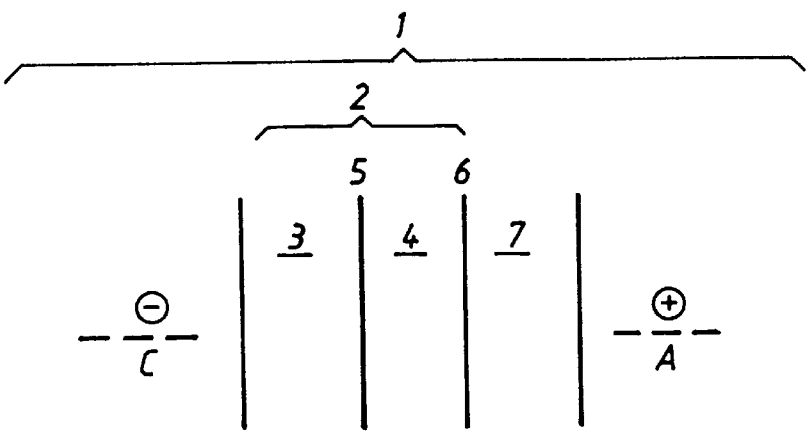
FIG. 1 is a schematic view illustrating an electrodialysis device containing one electrodialysis unit cell comprising two anion selective membranes.

By establishing an electrical potential difference between the electrodes, hydroxide ions present in the first compartment (3) are brought to migrate through the first anion selective membrane (5) into the second compartment (4) and organic and inorganic halogen present in the resin are brought to migrate as halogen ions through the second anion selective membrane (6) into the anode compartment (7). As a result of the electrodialysis treatment, an aqueous solution comprising a nitrogen-containing epihalohydrin-based resin having a reduced content of organic and inorganic halogen is withdrawn from the second compartment.

The feed to the anode compartments in the process of the invention can be an aqueous solution of a salt, metal halide, acid or metal hydroxide as previously defined. The ions should have good conductivity in the solution and they are suitably electrochemically inert.

Figure 2:
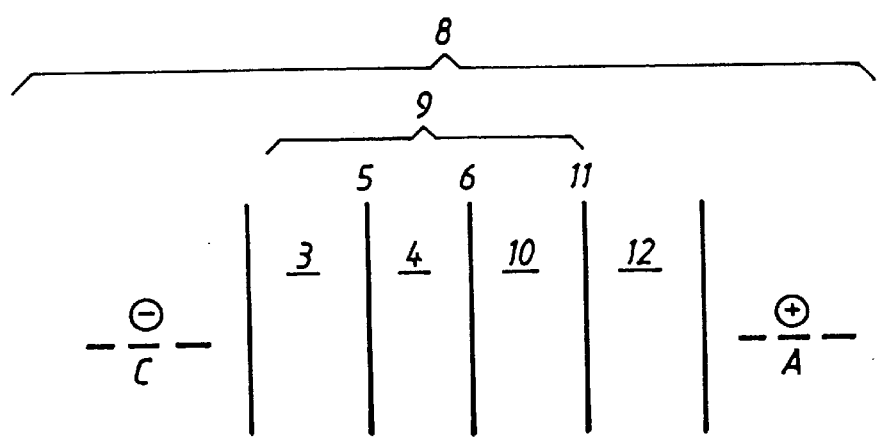
FIG. 2 illustrates the electrodialysis device of FIG. 1 further comprising one cation selective membrane.

FIG. 2 illustrates an electrodialysis device (8) similar to the device as outlined in FIG. 1, in which the unit cell (9) further comprises a third compartment (10) and a cation selective membrane (11) facing towards the anode. A further compartment adjacent to this electrodialysis unit cell is facing towards the anode, hereafter named the anode compartment (12). Solutions are passed through the first and second compartments (3,4) as described above. In addition, a sodium chloride solution is passed through the third compartment (10) and a sodium hydroxide solution is passed through the anode compartment (12).

By applying an electrical potential difference between the electrodes, hydroxide ions present in the first compartment (3) are brought to migrate through the first anion selective membrane (5), halogen ions present in the second compartment (4) are brought to migrate through the second anion selective membrane (6) and sodium ions present in the anode compartment (12) are forced to migrate through the cation selective membrane (11) into the third compartment (10), thereby to combine with the halogen ions entering from the second compartment (4) and forming a fortified sodium halide solution in the third compartment (10). By the electrodialysis treatment the content of organic and inorganic halogen is reduced in the aqueous resin solution. A hydroxide feed stream can be divided into feed solutions to the first compartment and to the anode compartment, respectively, and the discharge solutions from said compartments can be brought together to one stream which may be recirculated.

Figure 3:
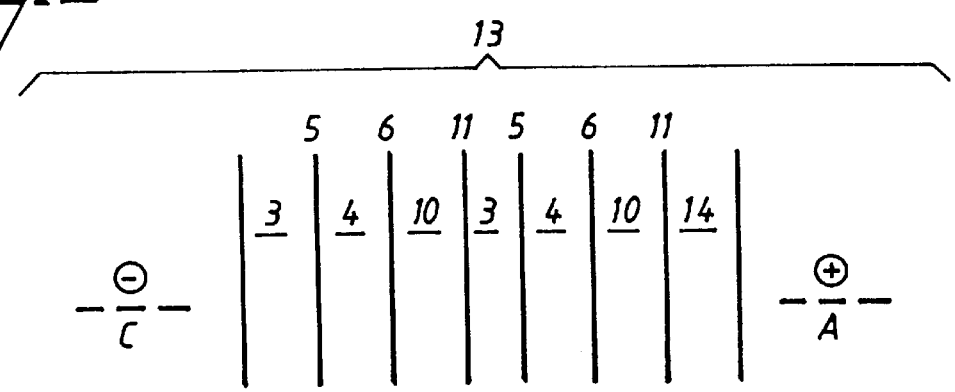
FIG. 3 is a schematic view illustrating an electrodialysis device containing two electrodialysis unit cells of FIG. 2.

The electrodialysis device can contain two or more unit cells. FIG. 3 shows a device (13) containing two unit cells of the type as outlined in FIG. 2 between the anode (A) and cathode (C). An anode compartment (14) is arranged between the anode and the unit cell facing towards the anode. The solutions are preferably recirculated, either back to the compartments from which they originated or to a corresponding compartment of another cell.

Figure 4:
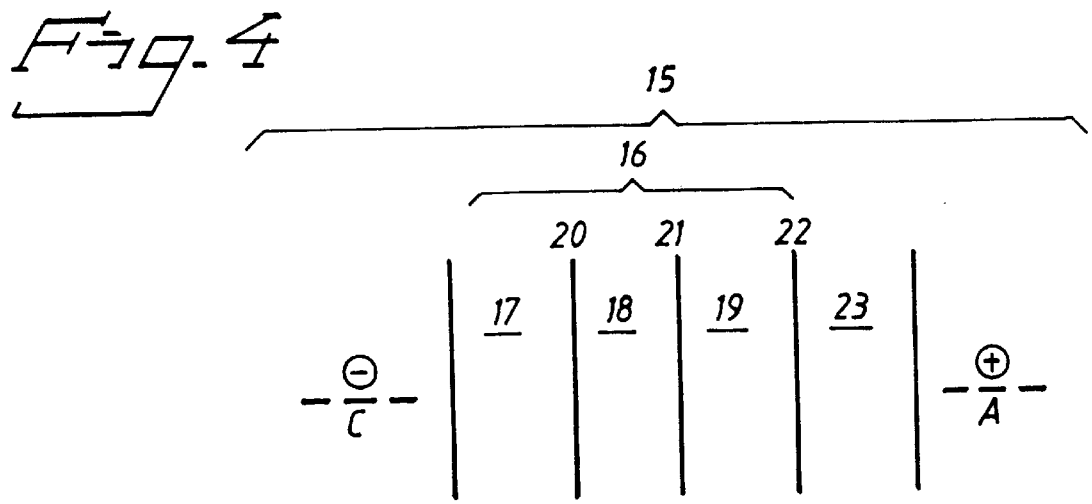
FIG. 4 is a schematic view illustrating an electrodialysis device comprising one anion selective membrane, one cation selective membrane and one bipolar membrane.

When a bipolar membrane is used in the process of the present invention, the electrodialysis device can be designed as outlined in FIG. 4. In the device (15), the unit cell (16) comprises first, second and third compartments (17,18,19), a bipolar membrane (20), an anion selective membrane (21) and a cation selective membrane (22). A further compartment adjacent to this electrodialysis unit cell is facing towards the anode, hereafter named the anode compartment (23). An aqueous solution comprising a nitrogen-containing epihalohydrin-based resin is fed to the second compartment (18), an aqueous sulphuric acid solution is passed through the first compartment (17) and to the anode compartment (23), respectively, and water or a hydrochloric acid solution is passed through the third compartment (19).

By establishing an electrical potential difference between the electrodes, the electrically forced dissociation of water in the bipolar membrane (20) results in the transfer of hydroxide ions into the second compartment (18). In addition, halogen ions present in the second compartment are brought to migrate through the anion selective membrane (21) into the third compartment (19) and protons fed to the anode compartment (23) are brought to migrate through the cation selective membrane (22) into the third compartment (19), in which a fortified solution of hydrohalide acid is formed.

A bipolar membrane multi unit cell device suitably contains at least one, preferably more than one unit cell of the type comprising an anion selective membrane and a bipolar membrane. It is preferred that a number of such cells are stacked between the electrodes and are facing towards the cathode. Preferably, this device further contains a unit cell of the type as described in FIG. 4 facing towards the anode.

Figure 5:
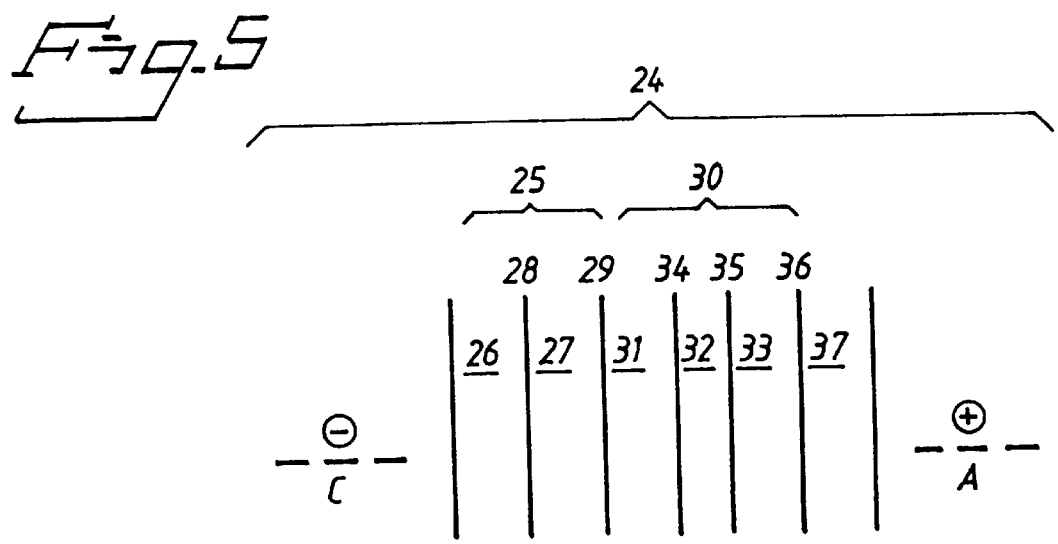
FIG. 5 is a schematic view illustrating an electrodialysis device containing two different electrodialysis unit cells suitably used when the aqueous resin solution is pre-treated with hydroxide ions.

FIG. 5 is a schematically view illustrating an electrodialysis device that can be used to reduce the content of organic and inorganic halogen in aqueous resin solutions pre-treated with hydroxide ions. The device (24) contains two different electrodialysis unit cells, wherein the first unit cell (25) is facing towards the cathode and comprises first and second compartments (26,27), a first cation selective membrane (28) and an anion selective membrane (29), and the second unit cell (30) comprises first, second and third compartments (31,32,33), a first cation selective membrane (34), an anion selective membrane (35) and a second cation selective membrane (36). A further compartment adjacent to the second electrodialysis unit cell is facing towards the anode, hereafter named the anode compartment (37). Aqueous solutions comprising a nitrogen-containing epihalohydrin-based resin and sodium hydroxide are passed through the second compartments (27,32) of both unit cells, an aqueous sodium hydroxide solution is passed through the first compartment (26) of the first unit cell, an aqueous sodium chloride solution is passed through the first compartment (31) of the second unit cell, an aqueous hydrochloric acid solution is passed through the third compartment (33) and an aqueous sulphuric acid solution is passed through the anode compartment (37).

By applying an electrical potential difference between the electrodes, halogen ions present in the resin solutions are brought to migrate through the anion selective membranes (29,35) of both unit cells into the first and third compartments (31,33) of the second unit cell, respectively, and sodium ions present in the resin solutions are brought to migrate through the first cation selective membranes (28,34) of both unit cells into the first compartments (26,31) of both unit cells, respectively. The resin solutions can be recirculated and further sodium hydroxide can be added to the resin solutions during the process.

A multi unit cell device for the treatment of aqueous resin solutions pre-treated with hydroxide ions as outlined in FIG. 5 suitably contains at least one, preferably more than one unit cell of the type comprising a cation selective membrane and an anion selective membrane. It is preferred that a number of such cells are stacked between the electrodes and are facing towards the cathode. Preferably this device further contains a unit cell facing towards the anode which is of the type comprising a first cation selective membrane, an anion selective membrane and a second cation selective membrane.

The invention is further illustrated by the following examples which, however, are not intended to limit the scope of the invention. Parts and per cent relate to parts by weight and per cent by weight respectively, unless otherwise stated. The solutions used in the examples are aqueous solutions.

EXAMPLE 1

An electrodialysis device of the type as essentially outlined in FIG. 2 was used for the electrodialysis treatment of a polyaminoamide-epichlorohydrin-based resin manufactured as described in Example 3 of WO 92/22601. The resin solution had a solids content of 20% by weight, a viscosity of 12 mPas and the treatment was started at a temperature of 20° C.

Approximately 2 l of an initially 1M sodium hydroxide solution and 2 l of an initially 0.1M sodium chloride solution were passed through the compartments as described in FIG. 2. The process was performed by continously pumping the solutions through the compartments with a flow rate of 140 ml/h and passing an electrical current of 10 A through the compartments. The initial voltage was 6.9 V. The electrodialysis device had an electrode surface area of 250 cm$^2$, and hence the current density amounted to 40 mA/cm$^2$.

After 100 min the treatment was stopped and the collected resin solution was heated 35° C. and kept at this temperature until a viscosity of 20 mPas (25° C.) was reached. The pH of the resin solution was adjusted to 3.5 by addition of sulphuric acid.

The analytical data of the resin solution were as follows:

|  | Before treatment | After treatment |
|---|---|---|
| Organic chlorine (OX) | 0.45% | 290 ppm |
| Inorganic chlorine (Cl$^-$) | 2.10% | 170 ppm |
| Total chlorine | 2.55% | 460 ppm |
| DCP content | 1250 ppm | <8 ppm |
| CPD content | 260 ppm | <8 ppm |
| AOX | 3.8 g/l | 25 ppm |

The content of total chlorine was determined using an AOX-combustion apparatus according to a standard method. The content of inorganic chlorine was determined by using argento-metric titration. The content of organic chlorine was calculated as the difference between content of total chlorine and inorganic chlorine. The contents of DCP and CPD were determined by using a gas chromatographic method having a detection limit of 8 ppm. The AOX (absorbable organic halogen) was determined in accordance with DIN 38049, part 14.

As is evident, a considerable reduction of the contents of organic and inorganic chlorine as well as by-products was achieved.

EXAMPLE 2

In this example the electrodialysis device of Example 1 was used, with the difference that the space between the two anion selective membranes, through which the resin solution is pumped, was filled with a strongly basic anion-exchange resin (Levatit™ M206, manufactured by Bayer).

The solutions of epihalohydrin-based resin, NaOH and NaCl as initially used in the process of Example 1 were similarity used in this example. The solutions were pumped through the compartments with a flow rate of 190 ml/h while passing an electrical current of 10 A between the electrodes. The voltage as about 7.0 to 8.0 V.

After 3 h the treatment was stopped and the collected resin solution was heated to 30° C. for further polymerisation until a viscosity of about 20 mPas was reached. Then the pH was adjusted with sulphuric acid to 3.6.

The analytical data of the resin solution were as follows:

|                        | Before treatment | After treatment |
|------------------------|------------------|-----------------|
| Organic chlorine (OX)  | 0.45%            | 110 ppm         |
| Inorganic chlorine (Cl⁻) | 2.10%          | 120 ppm         |
| Total chlorine         | 2.55%            | 230 ppm         |
| DCP content            | 1250 ppm         | <8 ppm          |
| CPD content            | 260 ppm          | <8 ppm          |
| AOX                    | 3.8 g/l          | <20 ppm         |

The analytical data were determined as described in Example 1.

EXAMPLE 3

The electrodialytical device of Example 1 was used in this example, with the difference that the first anion selective membrane facing towards the cathode was replaced by a cation selective membrane. A polyaminoamide-epichlorohydrin-based resin was prepared in a manner similar to that described in Example 3 of WO 92/22601, but using a molar ratio of epichlorohydrin which was increased by 5%. The resin solution had a solids content of 19% by weight, a pH of 5 and a viscosity of 19 mPas.

The resin solution was pre-treated by adding a sodium hydroxide solution, prepared from 20 ml 50% NaOH and 85 ml of water, to 395 g of the resin solution at room temperature. The resulting resin solution had a solids content of 15% by weight. The alkaline pre-treated resin solution was placed in a beaker cooled with an ice-bath and continuously pumped through the second compartment with a flow rate of 5 l/h. In addition, an initially 1M sodium hydroxide solution was continuously pumped through the first and anode compartments, respectively, and an initially 0.1M sodium chloride solution continuously pumped through the third compartment. The initial electrical current and voltage was 10.0 A and 9.5 V, respectively.

After 3 h 5 ml of 50% NaOH solution was further added to the pre-treated resin solution. After 4¼ h the process was stopped. The alkaline resin solution (pH≈13) was heated to 40° C. and kept at this temperature until a viscosity of 20 mPas was reached. The pH was adjusted with sulphuric acid to 3.6. The product had a solids content of 17.7% by weight.

The analytical data of the resin solution were as follows:

|                        | Before pre-treatment and electrodialysis treatment | After treatment |
|------------------------|---------------------------------------------------|-----------------|
| Organic chlorine (OX)  | 0.95%                                             | 300 ppm         |
| Inorganic chlorine (Cl⁻) | 1.74%                                           | 280 ppm         |
| Total chlorine         | 2.69%                                             | 580 ppm         |
| DCP content            | 3416 ppm                                          | <10 ppm         |
| CPD content            | 906 ppm                                           | 20 ppm          |
| AOX                    | 4.6 g/l                                           | 47 ppm          |

The analytical data were determined as described in Example 1.

EXAMPLE 4

An electrodialysis device of the type as essentially outlined in FIG. 4 comprising a bipolar membrane was used for the electrodialytical treatment of the polyaminoamide-epichlorohydrin-based resin solution prepared as described in Example 3. 395 g of the resin solution was diluted with 105 ml of water to yield a solids content of 15% by weight. The resin solutions was cooled with an ice-bath and continuously pumped through the second compartment with a flow-rate of 7.5 l/h. In addition, an initially 1M sulphuric acid solution and water were continuously pumped through the compartments as described in FIG. 4. In the process the electrical current and voltage mounted to 5.0 A and 18–30 V, respectively.

After 1 h 50 min, the electrodialytical treatment was stopped and the resin solution was heated to 30° C. and kept at this temperature until a viscosity of 20 mPas was reached. The pH was adjusted to 3.5 by addition of sulphuric acid.

The analytical data of the resin solution were as follows:

|                        | Before treatment | After treatment |
|------------------------|------------------|-----------------|
| Organic chlorine (OX)  | 0.95%            | 670 ppm         |
| Inorganic chlorine (Cl⁻) | 1.74%          | 880 ppm         |
| Total chlorine         | 2.69%            | 1550 ppm        |
| DCP content            | 3416 ppm         | 15 ppm          |
| CPD content            | 906 ppm          | 57 ppm          |
| AOX                    | 4.6 g/l          | 76 ppm          |

The analytical data were determined as described in Example 1.

EXAMPLE 5

In this example, the wet-strength efficiency of the resin solutions prepared in Examples 1–4 was tested. Test sheets of approximately 70 g/m² were prepared on a pilot paper machine (speed 2 m/min), capacity 2 kg/h). The furnish consisted of a 30/35/35 blend of bleached pine sulphate/birch sulphate/beech sulphate which had been beaten to a Schopper-Riegler freeness of 26° SR. The fillers DX 40 (Omua) and clay (Kaolin B), each in 5% by weight, were added to the stock at a temperature of 25° C. The resin solutions were fed to the paper machine after the stock dilution. The stock consistency at the headbox amounted to 0.3% and pH remained in the range of 7.2–7.8 for all products and concentrations, and were not adjusted. The temperatures of the cylinders in the drying section were adjusted to 60° C./80° C./90° C./110° C.

The paper was cured for 30 min at 100° C. for 2 h before testing. Paper strips were immersed in distilled water for 5 min at 23° C. before breaking length determinations using an Alwetron TH1™ hydrodynamic tester (Gockel & Co. GmbH, Munich).

The test results were as follows:

| Dosage (% on | Breaking length wet (m) | | | |
|--------------|-----------|-----------|-----------|-----------|
| dry content) | Example 1 | Example 2 | Example 3 | Example 4 |
| 0.3          | 730       | 730       | 840       | 810       |
| 0.6          | 980       | 990       | 1120      | 1140      |
| 0.9          | 1180      | 1140      | 1295      | 1280      |

I claim:

1. A process for reducing the content of organic and inorganic halogen in an aqueous solution of a nitrogen-containing epihalohydrin-based resin, which comprises subjecting said aqueous solution to an electrodialysis treatment.

2. The process of claim 1, wherein said electrodialysis treatment is conducted in an electrodialysis device containing at least one electro-dialysis unit cell arranged between an anode and a cathode, wherein the unit cell comprises a compartment which on the side facing towards the anode is delimited by an anion selective membrane, whereby the aqueous solution of a nitrogen-containing epihalohydrin-based resin is fed to said compartment and halogen ions are brought to migrate through said anion selective membrane by establishing an electrical potential difference between the anode and cathode.

3. The process of claim 2, wherein the electrodialysis unit cell comprises first and second compartments and first and second anion selective membrane, wherein the first anion selective membrane is facing towards the cathode, the first compartment is facing towards the cathode and is delimited by the first anion selective membrane, the second compartment is delimited by the first and second anion selective membrane, whereby the aqueous solution of a nitrogen-containing epihalohydrin-based resin is fed to the second compartment, non-halogen containing anions are fed to the first compartment and halogen ions are brought to migrate through the second anion selective membrane.

4. The process of claim 3, wherein said electrodialysis unit cell further comprise a third compartment and a cation selective membrane facing towards the anode, whereby the halogen ions are brought to migrate into the third compartment delimited by the second anion selective membrane and cation selective membrane.

5. The process of claim 3, wherein said electrodialysis unit cell further comprises a third compartment and a bipolar membrane facing towards the anode, whereby the halogen ions are brought to migrate into the third compartment delimited by the second anion selective membrane and bipolar membrane.

6. The process of claim 2, wherein the electrodialysis unit cell comprises first and second compartments, an anion selective membrane and a bipolar membrane, wherein the bipolar membrane is facing towards the cathode, the first compartment is facing towards the cathode and is delimited by the bipolar membrane, the second compartment is delimited by the bipolar membrane and anion selective membrane, whereby the aqueous solution of a nitrogen-containing epihalohydrin-based resin is fed to the second compartment, an aqueous solution of an acid or salt is fed to the first compartment and halogen ions are brought to migrate through the anion selective membrane.

7. The process of claim 6, wherein the electrodialysis unit cell further comprises a third compartment and a cation selective membrane facing towards the anode, whereby the halogen ions are brought to migrate into the third compartment delimited by the anion selective membrane and cation selective membrane.

8. The process of claim 2, wherein the electrodialysis unit cell comprises first and second compartments, an anion selective membrane and a first cation selective membrane, wherein the first cation selective membrane is facing towards the cathode, the first compartment is facing towards the cathode and delimited by the first cation selective membrane, the second compartment is delimited by the first cation selective membrane and anion selective membrane, whereby the aqueous solution of a nitrogen-containing epihalohydrin-based resin and hydroxide ions are fed to he second compartment and halogen ions are brought to migrate through the anion selective membrane.

9. The process of claim 8, wherein the electrodialysis unit cell further comprise a third compartment and a second cation selective membrane facing towards the anode, whereby the halogen ions are brought to migrate into the third compartment delimited by the anion selective membrane and second cation selective membrane.

10. The process of claim 2, wherein the aqueous solution of a nitrogen-containing epihalohydrin-based resin is contacted with an anion-exchange resin before, simultaneous with or after the electrodialysis treatment.

11. The process of claim 2, wherein the electrodialysis device contains at least two electrodialysis unit cells.

12. The process of claim 2 wherein the electrodialysis treatment is conducted continuously.

13. The process of claim 2 wherein the electrodialysis treatment is conducted semi-continuously.

14. The process of claim 1, wherein the nitrogen-containing epihalohydrin-based resin is a reaction product of a nitrogen-containing precursor selected from amines, polyamines, polyaminoamides and mixtures thereof and epichlorohydrin.

15. The process of claim 14, wherein the nitrogen-containing epihalohydrin-based resin is a polyamine-epichlorohydrin based resin.

16. The process of claim 14, wherein the nitrogen-containing epihalohydrin-based resin has a molecular weight of at least about 50,000.

17. The process of claim 1, wherein the nitrogen-containing epihalohydrin-based resin has a molecular weight of at least about 50,000.

18. A process for reducing the content of organic and inorganic halogen in an aqueous solution containing a polyamine-epichlorohydrin-based resin having a molecular weight of at least about 50,000 which comprises subjecting said aqueous solution to an electrodialysis treatment.

19. The process of claim 18, wherein the aqueous solution contains from about 5 to about 25% by weight of polyamine-epichlorohydrin-based resin.

20. The process of claim 18, wherein the aqueous solution has a viscosity within the range of from about 5 to about 60 mPas.

21. A process for reducing the content of organic and inorganic halogen in an aqueous solution containing a nitrogen-containing epichlorohydrin-based resin having a molecular weight of at least 50000; 1,3-dichloro-2-propanol; and 3-chloro-1,2-propanediol; comprising feeding said aqueous solution through an electrodialysis unit cell containing at least one ion selective membrane and in said cell subjecting said aqueous solution to electrodialysis treatment.

* * * * *